July 3, 1962  S. A. SPUNT  3,042,101
DIELECTRIC WELDING DEVICE
Filed Aug. 29, 1957  2 Sheets-Sheet 1

INVENTOR.
Shepard A. Spunt
BY Morse & Altman

July 3, 1962 S. A. SPUNT 3,042,101
DIELECTRIC WELDING DEVICE
Filed Aug. 29, 1957 2 Sheets-Sheet 2
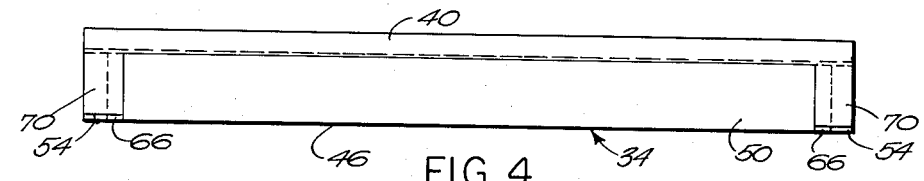
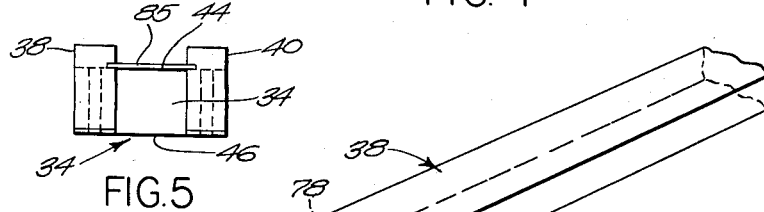
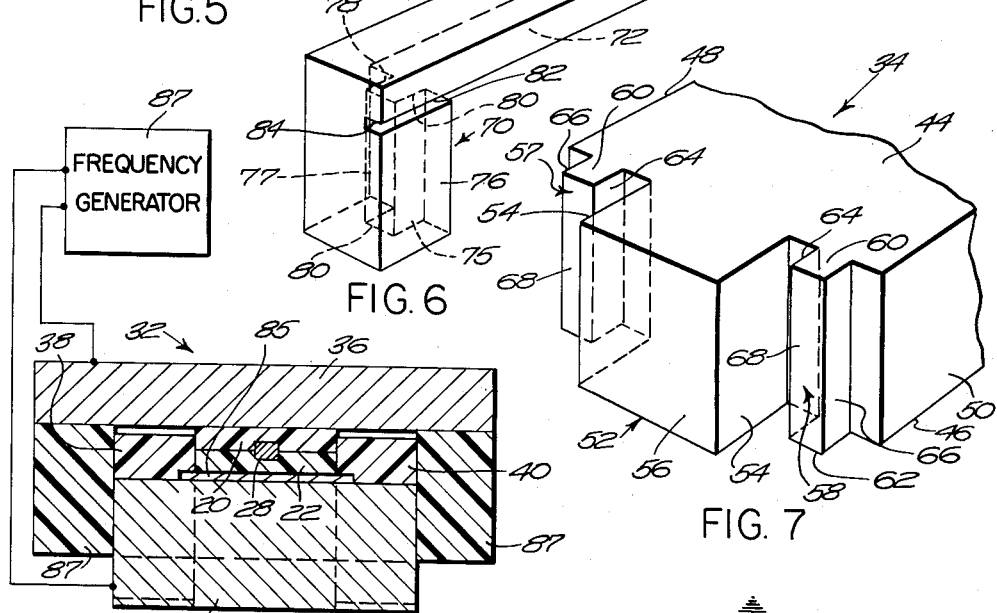
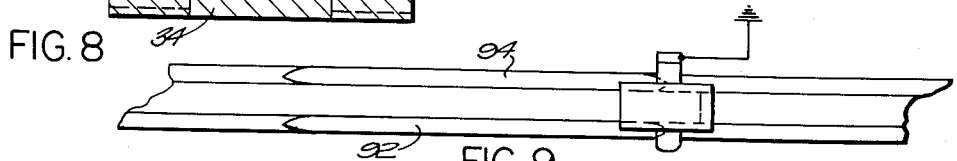
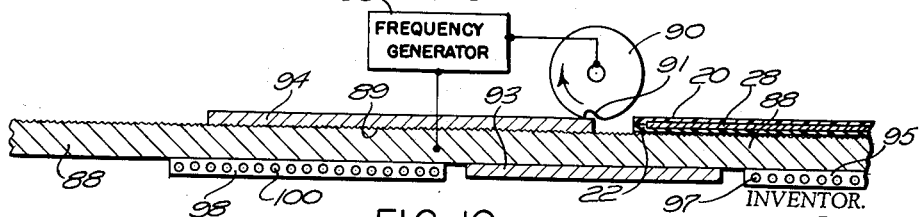
INVENTOR.
Shepard A. Spunt
BY
Morse & Altman

# United States Patent Office 3,042,101
Patented July 3, 1962

3,042,101
DIELECTRIC WELDING DEVICE
Shepard A. Spunt, 167 Fuller St., Brookline 46, Mass.
Filed Aug. 29, 1957, Ser. No. 680,952
4 Claims. (Cl. 156—380)

The present invention relates to plastic welding and, more particularly, to the high frequency dielectric welding of relatively thick plastic elements, which tend to lose predetermined configuration, surface decoration and internal texture as a result of heat transmission from the interfaces where primary heat generation occurs.

Primary objects of the present invention are: to provide novel processes and devices involving a welding structure including at least a pair of electrically conducting components and a pair of electrically insulating components that define a region within which a plurality of relatively thick plastic elements fit, a high frequency alternating current being applied across the electrically conducting components to effect welding, and the electrically insulating components cooperating with the electrically conducting components to prevent undesired external or internal distortion and/or to impart desired external configuration; to provide processes and devices involving a welding structure of the foregoing type in which one of the electrically conducting components constitutes a bed, the electrically insulating components constitute spacers along edges of the bed and the other electrically conducting component constitutes part of a cover which mates with the bed and the spacers; and to provide processes and devices involving a welding structure of the foregoing type in which the electrically conducting components and the electrically insulating components provide a region through which a plurality of assemblages of plastic elements to be welded may be advanced in assembly line fashion.

Other objects of the invention will in part be obvious and will in part appear hereinafter.

The invention accordingly comprises the process involving the several steps and the relation and order of one or more of such steps with respect to each of the others and the device possessing the construction, combination of elements and arrangement of parts which are exemplified in the following detailed disclosure and the scope of which will be indicated in the claims.

For a fuller understanding of the nature and objects of the present invention, reference should be had to the following detailed description taken in connection with the accompanying drawing wherein:

FIG. 4 is a side elevation of the device of FIG. 1;

FIG. 5 is an end elevation of the device of FIG. 1;

FIG. 6 is an enlarged perspective detail of a fragmentary component of the device of FIG. 1;

FIG. 7 is an enlarged perspective detail of another component of the device of FIG. 1;

FIG. 8 is a cross-sectional view of the device of FIG. 1, the section being taken substantially along the lines 8—8 of FIG. 3;

FIG. 9 is a top plan view of an alternative device embodying the present invention; and FIG. 10 is a side elevation of the device of FIG. 9.

Figure 1:
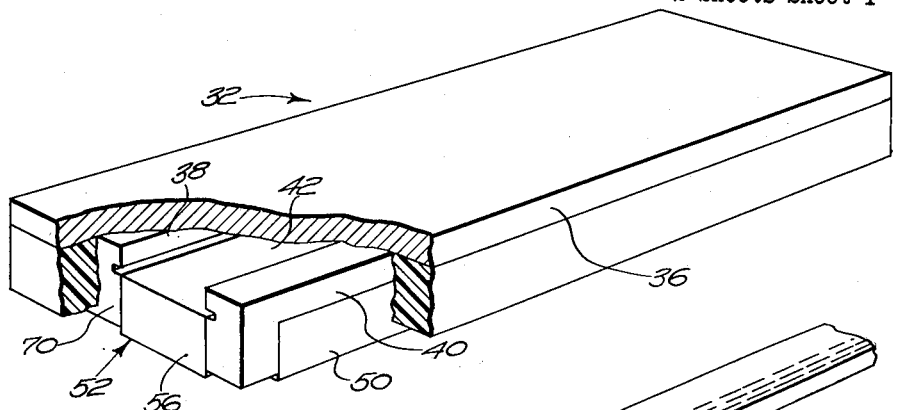
FIGURE 1 is a perspective view, partly broken away, of a device embodying the present invention.

Generally, the devices illustrated in the drawings are described in relation to a process for welding a pair of relatively thick plastic elements with a metallic reinforcement therebetween to form an eyeglass temple. Generally for this purpose, the elements, in total thickness across the applied radio frequency field, range from .1–.3 inch thick. Although a wide variety of thermoplastic organic high polymers may be welded in accordance with the present invention, the strips in relation to which the illustrated devices are described are composed preferably of a cellulosic such as cellulose acetate or cellulose nitrate, which normally is difficult to weld. The radio frequencies employed for this purpose preferably range from 5 to 300 megacycles per second, the voltage and amperage in any given case being dependent upon the dimensions of the elements to be welded and the material of which the elements are composed. Preferably, the electrically conducting components of the illustrated devices are composed of a non-tarnishing metal such as stainless steel or Monel metal, which may be coated with a mold release agent such as a silicone oil. Preferably the electrically insulating components are composed of a plastic which, in comparison with the thermoplastic elements to be welded, has a high softening or melting point and which will not adhere to the thermoplastic at its welding temperature. By the way of example, the material of the thermoplastic elements and the material of the electrically insulating components are incompatible synthetic plastics, i.e., synthetic plastics that do not form homogeneous mixtures. Where, for example, the thermoplastic elements are composed as indicated above of cellulose acetate or cellulose nitrate, the electrically insulating components, for example, are composed of tetrafluoroethylene, such as that sold by Du Pont under the trade name Teflon. Alternatively, the electrically insulating components are composed of a crystalline inorganic material such as quartz. In each case, auxiliary heating or cooling means, such as heating or cooling conduits in the electrically conducting components, may be provided for the purpose of decreasing the necessary duration of the high frequency pulse or confining heat generation to the interface between the thermoplastic elements being laminated.

Figure 2:
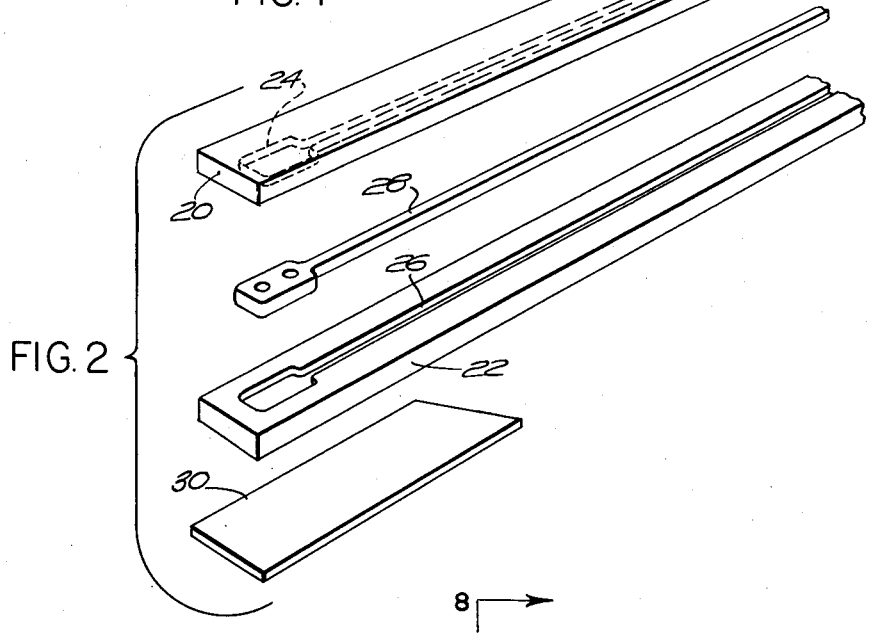
FIG. 2 is an exploded view of plastic and metallic elements to be welded together in the device of FIG. 1 in accordance with the present invention.
Figure 3:
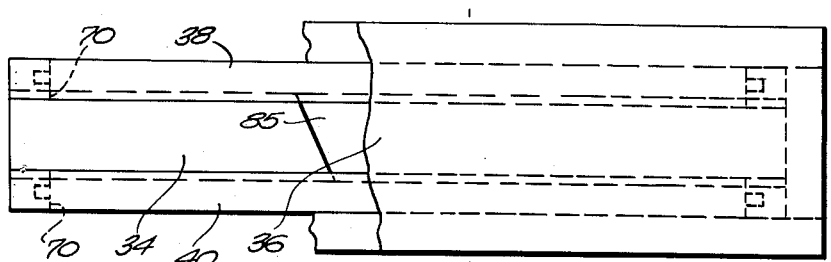
FIG. 3 is a top plan view of the device of FIG. 1.

FIGS. 1 and 3 through 8 disclose a device for welding a pair of plastic strips 20, 22 provided with a pair of depressions 24, 26, which define a cavity for the reception of a reinforcement 28, preferably metallic, when the strips are registered. A plastic overlay 30 also is laminated to one of these strips for decorative purposes. It will be understood that a plurality of such overlays may be laminated to one or both the faces of the strips in similar fashion. Overlay 30, strip 22, reinforcement 28 and strip 24 are designed to be welded into a unit, an exploded view of which is shown in FIG. 2, by the device generally designated by 32 in FIG. 1, now to be described in detail.

Generally, construction 32 comprises: a bed electrode 34 and a cover electrode 36, across which a radio frequency alternating voltage is applied; and a pair of insulating spacing walls 38 and 40. Construction 32 defines a cavity 42 within which welding is effected. As shown, bed electrode 34 has parallel upper and lower surfaces 44, 46, and a pair of parallel longitudinal edge faces 48, 50 that are perpendicular to upper and lower faces 44, 46. Projecting from each of the ends of electrode 34 is a medial lug 52 of which: the upper and lower faces are continuations of upper and lower surfaces 44, 46; the parallel side faces 54, 54 are perpendicular to faces 44, 46; and the outer face 56 is perpendicular to upper and lower faces 44, 46 and side faces 48, 50. Also extending from the end of electrode 34 on opposite sides of the medial lug are a pair of tongues 57, 58 of which: the upper and lower faces 60, 62 are continuations of upper and lower faces 44 and 46; the inner and outer side faces 64, 66 are spaced from and parallel to side faces 48, 50; and the end faces 68 are parallel to end face 56 of lug 52.

Insulating spacers 38 and 40, which are disposed along longitudinal edges of upper face 44 of electrode 34, are predeterminedly positioned upon electrode 34 by depending grooved blocks 70 at their opposite ends. Each block 70 is provided with internal surfaces 72, 76 that snugly abut against surfaces 44, 48 and 53 when internal surfaces 75, 77 and 78 abut against surfaces 64, 66 and 60 of tongues 57 and 58.

Each of spacers 38 and 40, when positioned upon an edge of electrode 34, provides an under face 82 that is spaced from upper face 44 of electrode 34 to provide a groove which is continued as a groove 84 through the end of block 70. The purpose of this groove is to permit the insertion of an electrically conducting strip 86 that is shaped to snugly fit against the lower face of element 22 notwithstanding the additional thickness attendant with overlay 30, which is of the same thickness as strip 86 and rests upon the portion of face 44 not occupied by strip 86. Where no overlay is desired, a modification of strip 86 may occupy the available portion of face 44 entirely. Strip 86 and its modification are composed, for example, of a non-tarnishing metal such as stainless steel or Monel metal.

As shown, cover electrode 36 is predeterminedly superposed over bed electrode 34 by means of a nonconducting rim 86 depending from cover electrode 36 and adapted to receive snugly the surfaces of spacers 38 and 40 of bed electrode 34 to which it has access. Rim 86, for example, is composed of the same material as are spacers 38 and 40.

In operation, spacers 38 and 40 are readily positioned at the edges of bed electrode 34 simply by fitting the grooves of blocks 70 to tongues 57 and 58. Next, strip 86 is inserted through groove 84 into the groove defined between spacers 38 and 40 and the upper face 44 of electrode 34. Thereafter overlay 30 is placed on the remaining free area of face 44 so that its inner edge contacts the corresponding inner edge of strip 86. Next, strip 22 is placed upon the upper faces of overlay 30 and strip 86, reinforcement 28 is seated in depression 26 and strip 20 is registered upon strip 22 so that depression 24 is seated upon reinforcement 28. Then, the cover electrode 36 is seated upon the spacers 38 and 40 with rim 86 snugly receiving spacers 38 and 40 as well as bed electrode 34. Finally, when a high frequency alternating voltage is applied across electrodes 34 and 36 from a suitable frequency generator 87, secure bonding is effected at the interfaces of the various components within cavity 42. Preferably, the initial dimensions of the assembly within cavity 42 are such that the upper face of strip 20 projects a small extent above the upper faces of strips 38 and 40, which are in a single plane, and a slight gap is left between the longitudinal edges of the assembly and the longitudinal inner faces of spacers 38 and 40. Thus, pressure is exerted upon the assembly within cavity 42 between cover electrode 36 and bed electrode 34, and lateral flow of the assembly is limited by spacers 38 and 40.

A device for effecting the process of the present invention in assembly line fashion is illustrated in FIGS. 9 and 10. This device comprises: a bed electrode in the form of a metallic conveyor belt 88 the upper face of which is scored, as at 89, to provide traction; an upper electrode in the form of a rotating wheel 90 at least the circumferential surface of which is cylindrical, being composed of an electrically conducting material of the aforementioned type, the circumference being interrupted by a notch 91 which serves to kick an initial assembly from contact therewith and to space it from a subsequent assembly; a pair of tunnel guide spacers 92 and 94, composed of an electrically insulating material of the aforementioned type, predeterminedly positioned with respect to wheel 90; a pressure platen 93 which cooperates with wheel 90; a preheating platen 95 which is provided with conduits 97 for a heating fluid; and a postcooling platen 98 which is provided with conduits 100 for a cooling fluid. The circumferential length of wheel 90, exclusive of the gap at notch 91, is somewhat longer than the length of the assembley to be laminated.

In operation, an assembly including elements 22, 28 and 20 of FIG. 2 is fed: first over heating platen 96; then between rotating wheel 90 and conveyor belt 88 and between spacers 92 and 94, a high frequency voltage being applied by a frequency generator 96 across electrode wheel 90 and conveyor belt 88 while the assembly advances; and finally over cooling platen 98. It will be understood that platens 96 and 98 may be replaced by other suitable heating and cooling means. The cross-sectional dimensions of this assembly bear the same relation to the cross-sectional dimensions of the region defined by aligned portions of wheel 90, conveyor belt 88, spacer 92 and spacer 94 as it does to the cross-sectional dimensions of cavity 42 of FIG. 1. The operation is such that lamination occurs at successive longitudinal positions along the assembly as it advances.

Although the illustrated embodiments relate to single cavity or region operation, the present invention is applicable as well to multi-cavity or region operation. Also, in a modified form of the embodiment of FIG. 1, electrodes 34 and 36 are provided with heating or cooling means, for example, conduits for a heating or cooling fluid so that heating or cooling can be effected before, during or after the radio frequency voltage is applied.

Since certain changes may be made in the above processes and devices without departing from the scope of the invention herein involved, it is intended that all matter contained in the above description and shown in the accompanying drawings shall be interpreted in an illustrative and not in a limiting sense.

What is claimed is:

1. A welding device comprising a die-like structure including at least a pair of electrically conducting components and a pair of electrically insulating components defining a cavity within which at least a pair of relatively thick plastic elements are adapted to fit, one electrically conducting component constituting a bed electrode, said pair of electrically insulating components constituting spacers, said spacers being in position along opposed edges of said bed electrodes, interlocking means for securing said spacers in said position, and a rim in conjunction with the other of said electrically conducting components constituting a cover, said rim snugly enveloping said spacers and said bed electrode.

2. The welding device of claim 1 wherein said spacers are composed of tetrafluoroethylene.

3. The welding device of claim 1 wherein said spacers are composed of quartz.

4. A welding device comprising a die-like structure including at least a pair of electrically conducting components and a pair of electrically insulating components defining a cavity within which at least a pair of relatively thick plastic elements are adapted to fit, one of said electrically conducting components constituting a first electrode, said pair of electrically insulating components being in position along opposite edges of said bed electrode, a cover including the other of said electrically conducting components constituting a second electrode in contact with said pair of electrically insulating components, said pair of electrically insulating components constituting spacers which limit relative movement of said first electrode and said second electrode toward each other into predetermined relative positions, and interlocking means predeterminedly locating said first electrode, said spacers and said second electrode with respect to each other when said first electrode and said second electrode are in said predetermined relative positions.

References Cited in the file of this patent

UNITED STATES PATENTS

| | | |
|---|---|---|
| 2,401,991 | Walton | June 11, 1946 |
| 2,407,833 | Jablonsky | Sept. 17, 1946 |
| 2,421,097 | Lakso | May 27, 1947 |
| 2,526,699 | Gard | Oct. 24, 1950 |
| 2,575,251 | Arnold | Nov. 13, 1951 |
| 2,623,985 | Hacklander | Dec. 30, 1952 |
| 2,705,993 | Mann | Apr. 12, 1955 |
| 2,730,281 | Prohaska | Jan. 10, 1956 |
| 2,779,847 | Bosomworth | Jan. 29, 1957 |